US008238952B1

(12) United States Patent
Kakarla et al.

(10) Patent No.: US 8,238,952 B1
(45) Date of Patent: Aug. 7, 2012

(54) FACILITATING A TEXT MESSAGE CONVERSATION USING TELE-LINKS

(75) Inventors: Kashinath Kakarla, Bangalore (IN); Vishnu Nanda, Bilekahalli Karnataka (IN); Sagar Dutta, Bangalore (IN); Anup P. Mutalik, Bangalore (IN); Girish Mallenahally Channakeshava, Bangalore (IN); Swathi Manjunath, Karnataka (IN); Anu Sreepathy, Bangalore (IN); Harsha K. Navada, Bangalore (IN); Sharath H. Upadhya, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/034,460

(22) Filed: Feb. 24, 2011

(51) Int. Cl.
*H04W 4/00* (2009.01)
(52) U.S. Cl. ...................................................... 455/466
(58) Field of Classification Search .................. 455/466
See application file for complete search history.

(56) References Cited

U.S. PATENT DOCUMENTS

| 2008/0004046 A1 | 1/2008 | Mumick et al. |
| 2008/0161058 A1* | 7/2008 | Park et al. ..................... 455/564 |
| 2009/0141875 A1 | 6/2009 | Demmitt et al. |

FOREIGN PATENT DOCUMENTS

WO 2009089084 A1 7/2009

* cited by examiner

*Primary Examiner* — Nick Corsaro
*Assistant Examiner* — Joel Ajayi
(74) *Attorney, Agent, or Firm* — Park, Vaughan, Fleming & Dowler LLP

(57) ABSTRACT

One embodiment of the present invention provides a system for facilitating a text message conversation using tele-links. During operation, the system receives a text message from a service at a mobile device, wherein the text message includes a tele-link, wherein the tele-link is comprised of a phone number. Next, the system receives a selection of the tele-link from a user at the mobile device. In response to the selection, the system then automatically initiates a call from the mobile device to a number indicated by the tele-link, wherein the act of calling the number results in the service sending a second text message to the mobile device. Finally, the system receives the second text message from the service at the mobile device.

14 Claims, 4 Drawing Sheets

COMPUTING ENVIRONMENT 100

FACILITATING A TEXT MESSAGE CONVERSATION USING TELE-LINKS

RELATED APPLICATIONS

This application claims priority under 35 U.S.C. §119 to India Patent Application No. 195/KOL/2011 entitled "Facilitating a Text Message Conversation Using Tele-Links" by the same inventors as the instant application filed on 15 Feb. 2011.

BACKGROUND

Related Art

With ever-increasing numbers of cell phones on the market, and the declining costs of text messaging, organizations are starting to use text messaging as a means for delivering advertising content to consumers. A given text message advertisement often includes a code in the message and asks the consumer to reply with the code to receive more details. For example, a typical advertising text message might look like the following: "25% off on imported handbags at ABC Luggage. Reply with code AXHG for location details."

While these text message advertisements can be effective in quickly communicating promotional details to consumers, they also have a few drawbacks. For example, in the scenario described above, the consumer has to make an additional effort to remember the code (or copy and paste the code) and to include it in the reply message. Additionally, sending text messages may involve an associated cost for the consumer. With some telecommunication carriers, incoming text messages are free, but outgoing messages are charged to the consumer. These two factors often dissuade the consumer from replying back to the system.

SUMMARY

One embodiment of the present invention provides a system for facilitating a text message conversation using tele-links. During operation, the system receives a text message from a service at a mobile device, wherein the text message includes a tele-link, and wherein the tele-link is comprised of a phone number. Next, the system receives a selection of the tele-link from a user at the mobile device. In response to the selection, the system then automatically initiates a call from the mobile device to a number indicated by the tele-link, wherein the act of calling the number results in the service sending a second text message to the mobile device. Finally, the system receives the second text message from the service at the mobile device. Note that embodiments of the present invention can be used in any system where user interaction is needed, and wherein the information is conveyed to the user via a text message and information is received from the user via a telephone call or an attempted telephone call.

In some embodiments of the present invention, the number indicated by the tele-link includes dual-tone multi-frequency signaling (DTMF) numbers after the phone number, wherein the DTMF numbers are sent to the service via the call.

In some embodiments of the present invention, the text message is a short message service (SMS) message.

One embodiment of the present invention provides a system for facilitating a text message conversation using tele-links. During operation, the system sends a text message to a mobile device, wherein the text message includes a tele-link, and wherein the tele-link is comprised of a phone number. Next, the system receives a call from the mobile device at the phone number specified by the tele-link. Finally, in response to receiving the call from the mobile device, the system sends a second text message to the mobile device.

In some embodiments of the present invention, receiving the call from the mobile device at the phone number specified by the tele-link further involves the system identifying a phone number of the mobile device placing the call prior to the system answering the call. Additionally, the system terminates the call from the mobile device without answering the call.

In some embodiments of the present invention, receiving the call from the mobile device at the phone number specified by the tele-link further involves the system identifying a phone number of the mobile device placing the call prior to answering the call. Additionally, the system sends a busy signal to the mobile device.

In some embodiments of the present invention, receiving the call from the mobile device at the phone number specified by the tele-link further involves the system identifying a phone number and a context of the mobile device placing the call. Next, the system answers the call from the mobile device. Finally, the system terminates the call from the mobile device.

In some embodiments of the present invention, prior to terminating the call from the mobile device, the system receives one or more dual-tone multi-frequency signaling (DTMF) tones from the mobile device. Finally, the system uses the one or more DTMF tones to determine a content of the second SMS message.

In some embodiments of the present invention, the system identifies a phone number of the mobile device by using a calling line identification (CLID) or calling number identification (CNID) service.

In some embodiments of the present invention, the system identifies a phone number of the mobile device by receiving the call at the number specified by the tele-link.

In some embodiments of the present invention, the system identifies a phone number of the mobile device by identifying one or more dual-tone multi-frequency signaling (DTMF) tones received from the mobile device during the call.

In some embodiments of the present invention, the text message is a short message service (SMS) message.

DETAILED DESCRIPTION

Figure 1:
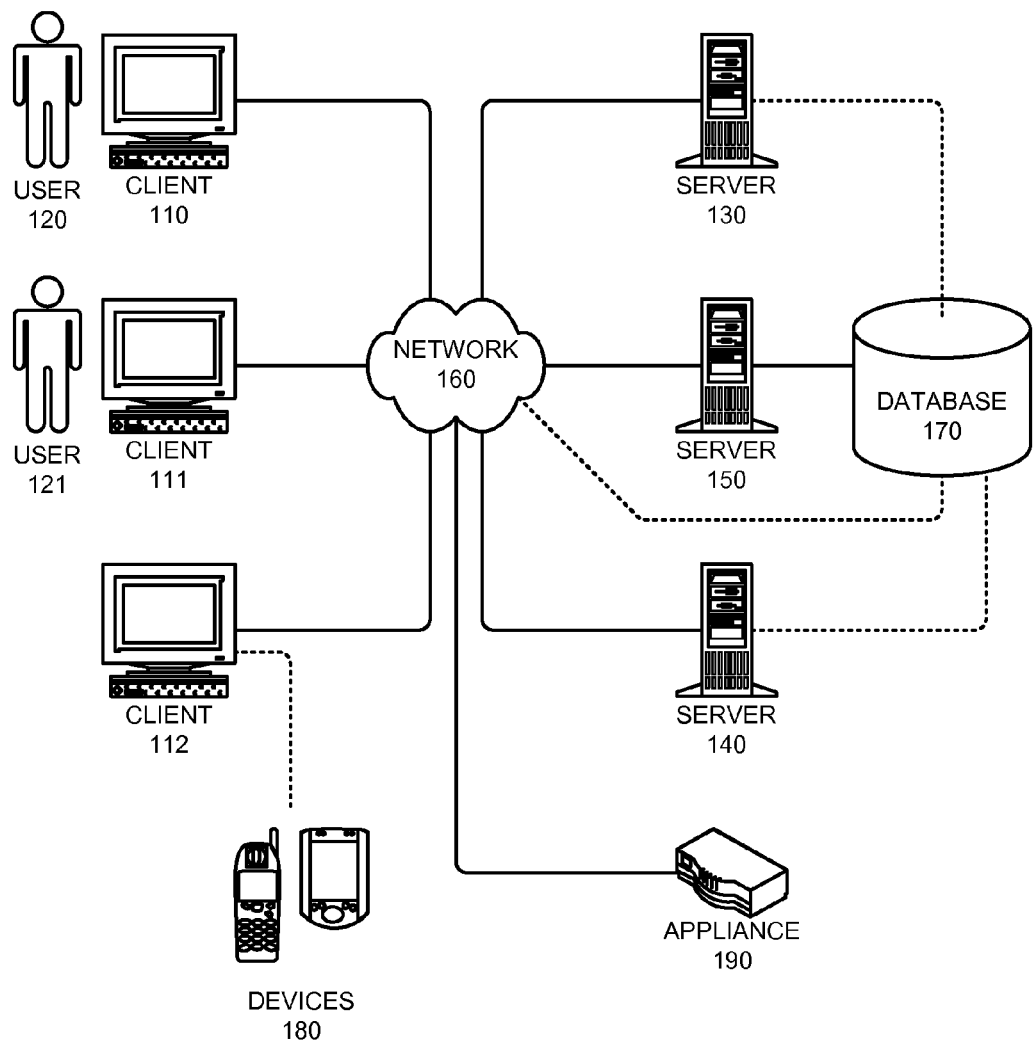
FIG. 1 illustrates a computing environment in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored on a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

One embodiment of the present invention provides a system for facilitating a text message conversation using tele-links. Note that a "tele-link" is a standard telephone number, adhering to tel url specifications, inserted within a text message. During operation, the system receives a text message from a service at a mobile device, wherein the text message includes a tele-link, wherein the tele-link is comprised of a phone number. For example, the system might receive a text message that says: "25% off on imported handbags at ABC Luggage. Give a missed call to 080417692001 for location details."

Next, the system receives a selection of the tele-link from a user at the mobile device. In response to the selection, the system then automatically initiates a call from the mobile device to a number indicated by the tele-link, wherein the act of calling the number results in the service sending a second text message to the mobile device. Finally, the system receives the second text message from the service at the mobile device. In this example, the user receiving the text message can simply select and give a missed call to the number to receive additional information. A service receiving the missed call can identify the caller from whom the missed call originated, identify the context based on the number to which the user dialed, and using this information, respond back to the user with another text message with the requested details.

In some embodiments of the present invention, the number indicated by the tele-link includes dual-tone multi-frequency (DTMF) signaling numbers after the phone number, wherein the DTMF numbers are sent to the service via the call. For example, the original text message might be: "Sony TV 32 inch LCD @ 80% off @ Best Bbuy. Give a call to 08041769200#674 for more info."

In this example, the "#" character instructs the handset to wait a pre-determined amount of time prior to sending the DTMF tones that follow. Once the pre-determined amount of time has been reached, the "674" is sent over the open communication channel. Note that the system may use the number of the incoming call, the DTMF numbers, or both, to identify the context for the user. Additionally, the DTMF numbers are used to identify the request from the user. In some embodiments, only the DTMF numbers are used to identify the user to facilitate receiving calls from the user on a phone other than the phone to which the original text message was sent.

In some embodiments of the present invention, the text message is a short message service (SMS) message. While some of the examples herein refer to SMS messages, embodiments of the present invention are not meant to be limited to SMS messages. Any type of text messaging technology may be used with embodiments of the present invention.

One embodiment of the present invention provides a system for facilitating a text message conversation using tele-links. During operation, the system sends a text message to a mobile device, wherein the text message includes a tele-link, wherein the tele-link is comprised of a phone number. Next, the system receives a call from the mobile device at the phone number specified by the tele-link. Finally, in response to receiving the call from the mobile device, the system sends a second text message to the mobile device.

In most of the mobile devices, SMS message readers detect a telephone number pattern, highlight the number, and provide a menu option to "Call" the number. This enables the user reading the message to simply press the call button to place a missed call to the number highlighted or selected in the SMS message. Note that placing a missed call refers to dialing a number and hanging up after one ring, or having the system automatically disconnect the caller. In this example, the call is never connected to the destination. This technique greatly reduces the effort in replying. Additionally, on many carriers, missed calls are not charged.

In one embodiment, the system has a pool of allocated telephone numbers. This pool can also be supported via a private exchange with a base number and multiple extensions. The system also has a missed call detector that receives an incoming call, optionally responds with a tone, and disconnects the call while capturing the call origin number. In these embodiments, the system uses the pool of numbers in the SMS messages and uses appropriate bookkeeping to identify the context in which the number was used as a tele-link. Since this context is tied to the user's number to which the SMS was sent with the tele-link (a number from the pool) inserted, the same numbers from the pool can be used for multiple consumers, thus re-using a limited set of numbers and effectively utilizing the telephonic resources. Other embodiments use interactive voice response (IVR) systems with missed call detection functionality.

Computing Environment

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, devices 180, and appliance 190.

Clients 110-112 can include any node on a network including computational capability and including a mechanism for communicating across the network. Additionally, clients 110-112 may comprise a tier in an n-tier application architecture, wherein clients 110-112 perform as servers (servicing requests from lower tiers or users), and wherein clients 110-112 perform as clients (forwarding the requests to a higher tier).

Similarly, servers 130-150 can generally include any node on a network including a mechanism for servicing requests from a client for computational and/or data storage resources. Servers 130-150 can participate in an advanced computing cluster, or can act as stand-alone servers. In one embodiment of the present invention, server 140 is an online "hot spare" of server 150.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network.

Devices 180 can include any type of electronic device that can be coupled to a client, such as client 112. This includes, but is not limited to, cell phones, personal digital assistants (PDAs), smartphones, personal music players (such as MP3 players), gaming systems, digital cameras, video cameras, portable storage media, or any other device that can be coupled to the client. Note that, in some embodiments of the present invention, devices 180 can be coupled directly to network 160 and can function in the same manner as clients 110-112.

Appliance 190 can include any type of appliance that can be coupled to network 160. This includes, but is not limited to, routers, switches, load balancers, network accelerators, and specialty processors. Appliance 190 may act as a gateway, a proxy, or a translator between server 140 and network 160.

Note that different embodiments of the present invention may use different system configurations, and are not limited to the system configuration illustrated in computing environment 100. In general, any device that is capable of communicating via network 160 may incorporate elements of the present invention.

Systems

Figure 2:
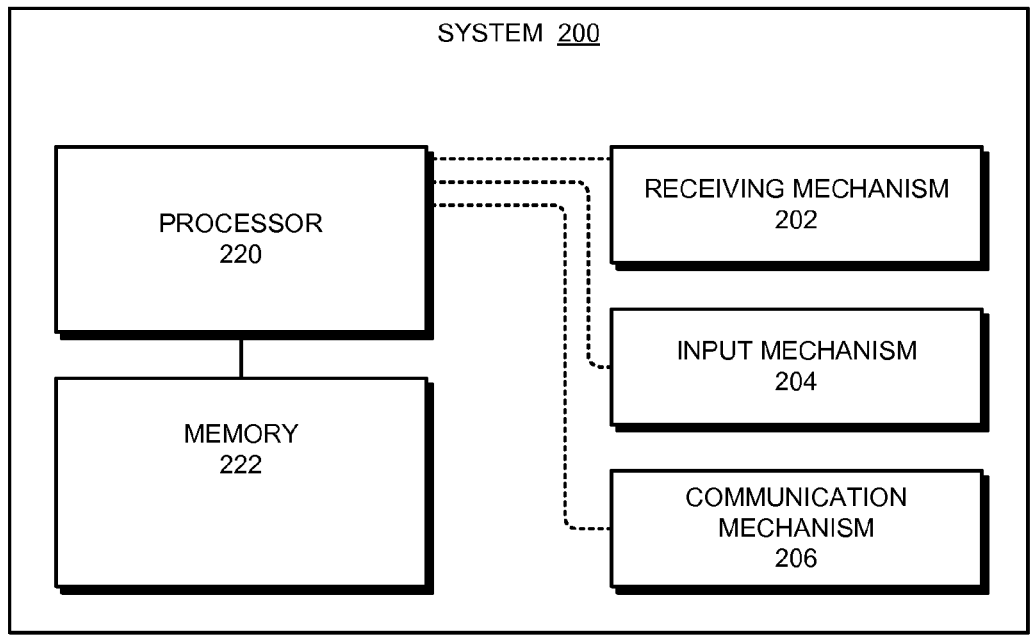
FIG. 2 illustrates a system in accordance with an embodiment of the present invention.

FIG. 2 illustrates a system 200 in accordance with an embodiment of the present invention. As illustrated in FIG. 2, system 200 can comprise server 150, database 170, appliance 190, client 110, devices 180, or any combination thereof. System 200 can also include receiving mechanism 202, input mechanism 204, communication mechanism 206, processor 220, and memory 222. In some embodiments of the present invention, system 200 is a mobile phone.

Figure 3:
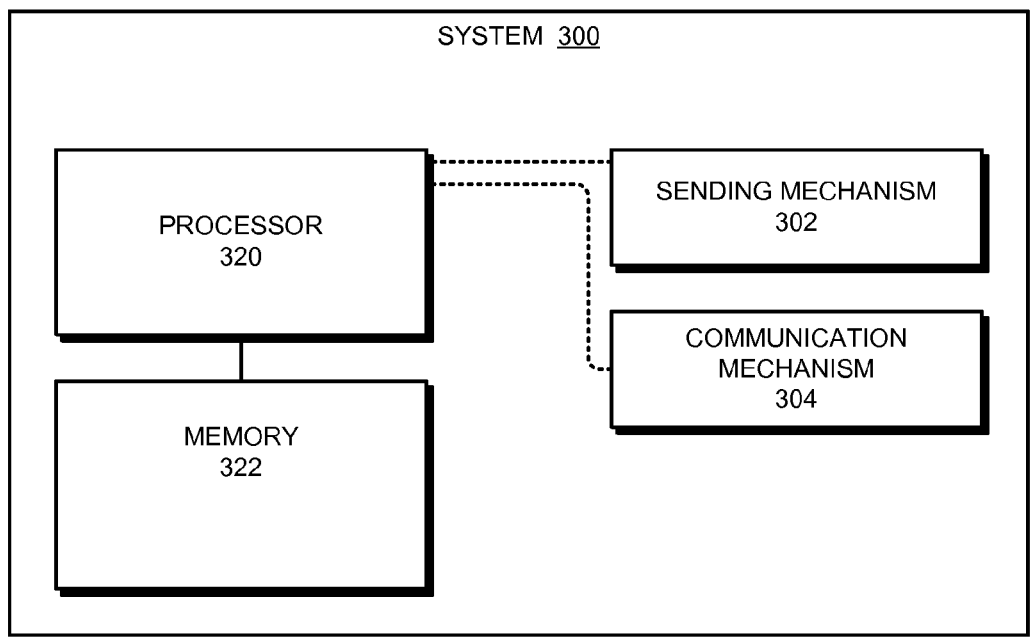
FIG. 3 illustrates a system in accordance with an embodiment of the present invention.

FIG. 3 illustrates a system 300 in accordance with an embodiment of the present invention. As illustrated in FIG. 3, system 300 can comprise server 150, database 170, appliance 190, client 110, devices 180, or any combination thereof. System 300 can also include sending mechanism 302, communication mechanism 304, processor 320, and memory 322.

Responding to Advertising Text Messages with Tele-Links

Figure 4:
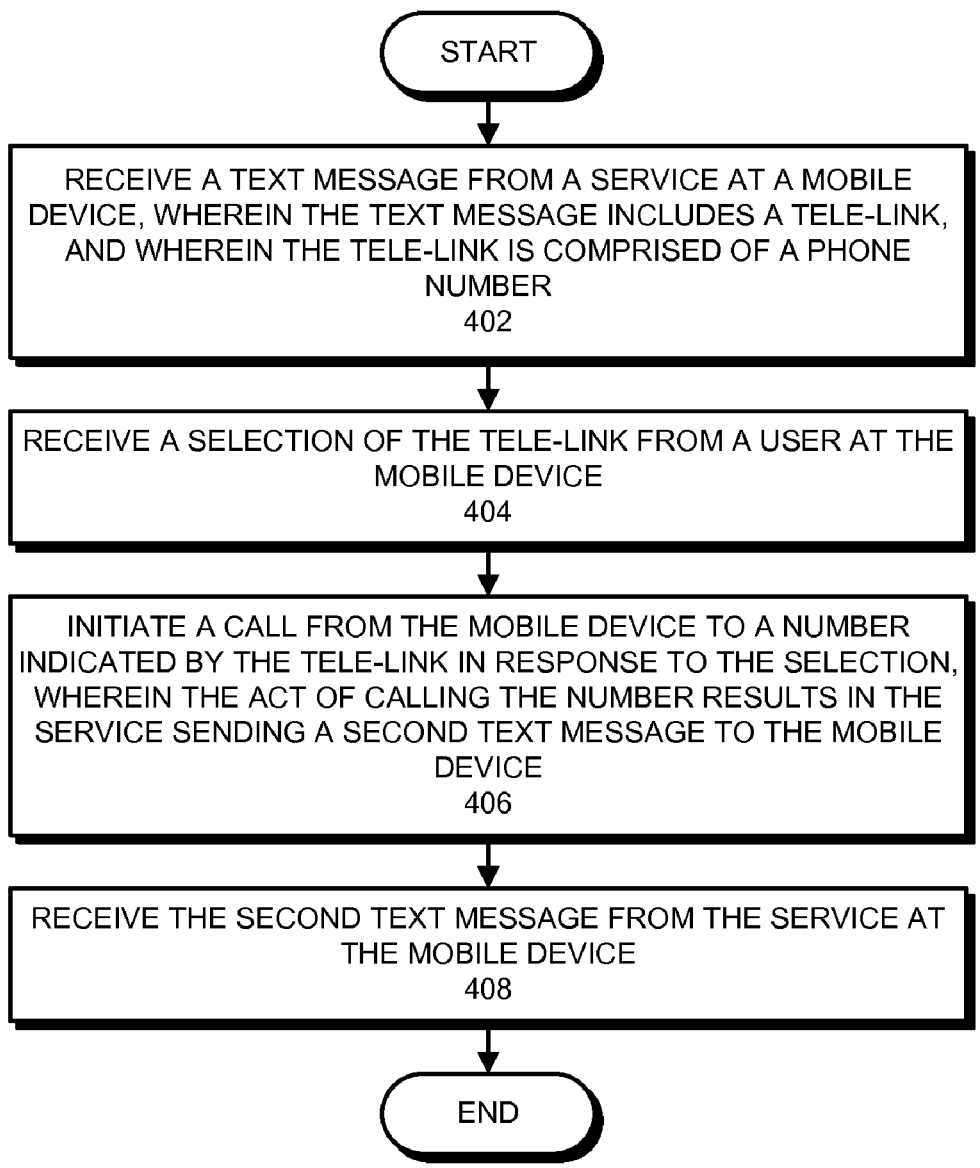
FIG. 4 presents a flow chart illustrating the process of responding to advertising text messages with tele-links in accordance with an embodiment of the present invention.

FIG. 4 presents a flow chart illustrating the process of responding to advertising text messages with tele-links in accordance with an embodiment of the present invention. During operation, receiving mechanism 202 receives a text message from a service at a mobile device, such as devices 180, wherein the text message includes a tele-link, and wherein the tele-link is comprised of a phone number (operation 402). Next, input mechanism 204 receives a selection of the tele-link from a user, such as user 120, at the mobile device (operation 404). In response to the selection of the tele-link, communication mechanism 206 automatically initiates a call from the mobile device to a number indicated by the tele-link, wherein the act of calling the number results in the service sending a second text message to the mobile device (operation 406). Finally, receiving mechanism 202 receives the second text message from the service at the mobile device (operation 408).

Sending Advertising Text Messages with Tele-Links

Figure 5:
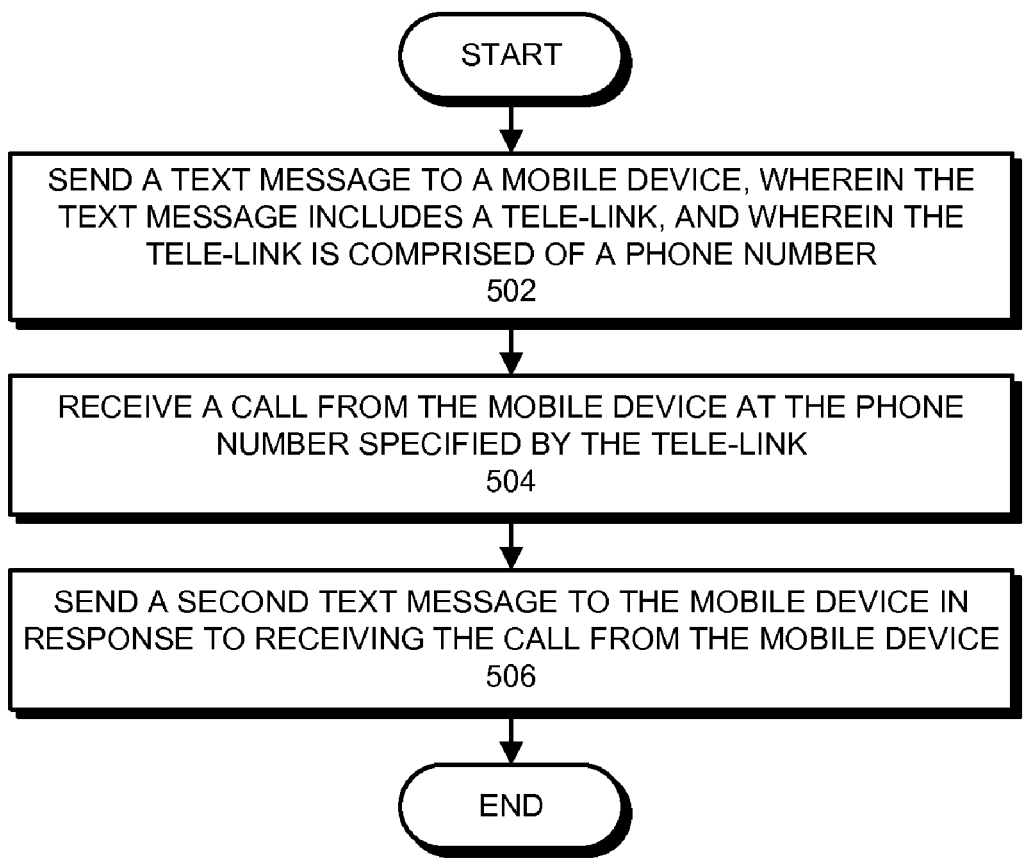
FIG. 5 presents a flow chart illustrating the process of sending advertising text messages with tele-links in accordance with an embodiment of the present invention.

FIG. 5 presents a flow chart illustrating the process of sending advertising text messages with tele-links in accordance with an embodiment of the present invention. During operation, sending mechanism 302 sends a text message to a mobile device, such as devices 180, wherein the text message includes a tele-link, and wherein the tele-link is comprised of a phone number (operation 502). Next, communication mechanism 304 receives a call from the mobile device at the phone number specified by the tele-link (operation 504). Finally, sending mechanism 302 sends a second text message to the mobile device in response to receiving the call from the mobile device (operation 506).

Note that while the description herein describes embodiments of the present invention in the context of advertising, embodiments of the present invention are not meant to be limited to advertising scenarios. Any scenario wherein information can be conveyed via text messaging and responses can be received via a phone call can be implemented with embodiments of the present invention. For example, in some embodiments of the present invention, the system may be used for browsing a website, such as Wikipedia. In this example, a user may receive Wikipedia content via text messages and send navigation commands back to the system via tele-links.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for facilitating a text message conversation using tele-links, the method comprising:

receiving a text message from a service at a mobile device, wherein the text message includes a tele-link, wherein the tele-link is comprised of a phone number, wherein the number indicated by the tele-link includes dual-tone multi-frequency signaling (DTMF) numbers after the phone number, wherein the DTMF numbers are automatically sent to the service via the call;

receiving a selection of the tele-link from a user at the mobile device;

in response to the selection, automatically initiating a call from the mobile device to a number indicated by the tele-link, wherein the act of calling the number results in the service automatically sending a second text message to the mobile device; and receiving the second text message from the service at the mobile device.

2. The computer-implemented method of claim 1, wherein the text message is a short message service (SMS) message.

3. A computer-implemented method for facilitating a text message conversation using tele-links, the method comprising:

sending, by computer, a text message to a mobile device, wherein the text message includes a tele-link, wherein the tele-link is comprised of a phone number;

receiving, by computer, a call from the mobile device at the phone number specified by the tele-link;

identifying, by computer, a phone number of the mobile device placing the call prior to answering the call;

terminating, by computer, the call from the mobile device without answering the call; and in response to receiving the call from the mobile device, automatically sending, by computer, a second text message to the mobile device.

4. The computer-implemented method of claim 3, wherein receiving the call from the mobile device at the phone number specified by the tele-link further involves sending a busy signal to the mobile device.

5. The computer-implemented method of claim 3, further comprising identifying a phone number of the mobile device by using a calling line identification (CLID) or calling number identification (CNID) service.

6. The computer-implemented method of claim 3, further comprising identifying a phone number of the mobile device by receiving the call at the number specified by the tele-link.

7. The computer-implemented method of claim 3, wherein the text message is a short message service (SMS) message.

8. A non-transitory computer-readable storage medium storing instructions that when executed by a computer cause the computer to perform a method for facilitating a text message conversation using tele-links, the method comprising:

receiving a text message from a service at a mobile device, wherein the text message includes a tele-link, wherein the tele-link is comprised of a phone number, wherein the number indicated by the tele-link includes dual-tone multi-frequency signaling (DTMF) numbers after the phone number, wherein the DTMF numbers are automatically sent to the service via the call;

receiving a selection of the tele-link from a user at the mobile device;

in response to the selection, automatically initiating a call from the mobile device to a number indicated by the tele-link, wherein the act of calling the number results in the service automatically sending a second text message to the mobile device; and receiving the second text message from the service at the mobile device.

9. The non-transitory computer-readable storage medium of claim 8, wherein the text message is a short message service (SMS) message.

10. A non-transitory computer-readable storage medium storing instructions that when executed by a computer cause the computer to perform a method for facilitating a text message conversation using tele-links, the method comprising:

sending a text message to a mobile device, wherein the text message includes a tele-link, wherein the tele-link is comprised of a phone number;

receiving a call from the mobile device at the phone number specified by the tele-link;

identifying a phone number of the mobile device placing the call prior to answering the call;

terminating the call from the mobile device without answering the call; and in response to receiving the call from the mobile device, automatically sending a second text message to the mobile device.

11. The non-transitory computer-readable storage medium of claim 10, wherein receiving the call from the mobile device at the phone number specified by the tele-link further involves sending a busy signal to the mobile device.

12. The non-transitory computer-readable storage medium of claim 10, wherein the method further comprises identifying a phone number of the mobile device by using a calling line identification (CLID) or calling number identification (CNID) service.

13. An apparatus for facilitating a text message conversation using tele-links, comprising:

a memory;

a processor;

a receiving mechanism configured to receive a text message from a service at a mobile device, wherein the text message includes a tele-link, wherein the tele-link is comprised of a phone number, wherein the number indicated by the tele-link includes dual-tone multi-frequency signaling (DTMF) numbers after the phone number, wherein the DTMF numbers are automatically sent to the service via the call;

an input mechanism configured to receive a selection of the tele-link from a user at the mobile device;

a communication mechanism configured to automatically initiate a call from the mobile device to a number indicated by the tele-link in response to the selection, wherein the act of calling the number results in the service automatically sending a second text message to the mobile device; and wherein the receiving mechanism is further configured to receive the second text message from the service at the mobile device.

14. An apparatus for facilitating a text message conversation using tele-links, comprising:

a memory;

a processor;

a sending mechanism configured to send a text message to a mobile device, wherein the text message includes a tele-link, wherein the tele-link is comprised of a phone number;

a communication mechanism configured to receive a call from the mobile device at the phone number specified by the tele-link;

an identification mechanism configured to identify a phone number of the mobile device placing the call prior to answering the call;

a termination mechanism configured to terminate the call from the mobile device without answering the call; and wherein the sending mechanism is further configured to send a second text message to the mobile device in response to receiving the call from the mobile device.

* * * * *